INVENTOR.
SAM H. PITTS, JR.

United States Patent Office  3,718,677
Patented Feb. 27, 1973

3,718,677
PLUTONIUM DISSOLUTION AND PLUTONIUM ALKOXIDE PRODUCT
Sam H. Pitts, Jr., Arvada, Colo., assignor to the United States of America as represented by the United States Atomic Energy Commission
Filed Dec. 29, 1971, Ser. No. 213,301
Int. Cl. C07f 13/00
U.S. Cl. 260—429.1    8 Claims

ABSTRACT OF THE DISCLOSURE

Nonaqueous method of dissolving plutonium and product formed, the method being submerging plutonium in a bath containing an alkyl alcohol taken from the group ROH, where R is an alkyl radical having from 1 to 4 atoms of carbon, and a halogen, either as an absorbed gas or as a compound such as $RX_n$, where R is a straight chain alkyl radical and X is a halide, filtering the solution after dissolution is complete, and evaporating the filtrate to yield a plutonium compound.

BACKGROUND OF INVENTION

The dissolution of plutonium in aqueous acidic media is well known. The high cost of plutonium and the general need for this material warrants the expensive measures which are used to dissolve and reclaim plutonium. An example of an aqueous process is dissolving the plutonium residue, scrap, etc., in nitric-hydrofluoric acid solutions, passing these solutions through ion exchange columns, precipitating and filtering the plutonium as plutonium peroxide from the solutions and then calcining the precipitate to plutonium dioxide.

As is readily evident, the process outlined above constitutes a high cost operation and may have a risk factor of accidental radiation exposure or acid burns to personnel if improperly handled. Further, the remaining liquid and solid waste still require extensive processing for reuse and/or disposal with subsequent disposal problems. An additional major problem is that the acid baths described above dissolve other substrates so that the solvent is contaminated with materials other than plutonium. This is especially true where such substrates as glass or ceramics are employed.

SUMMARY OF INVENTION

In view of the limitations and problems of the prior art as noted above, it is an object of this invention to provide a novel process for the dissolution of plutonium and for production of the resultant novel products. It is a further object of this invention to provide a nonaqueous method of dissolving plutonium. It is a further object of this invention to provide a simple method of quickly dissolving plutonium so as to minimize waste, disposal problems and cost.

It is a further object of this invention to obtain a plutonium solution wherein contamination by the substrate materials has been minimized during the dissolution step.

It is a further object of this invention to provide a process for removing plutonium from a material to which it may be adhered without objectionably affecting said material.

It is a further object of this invention to allow the separation of plutonium from organic materials without extensive processing.

It is a further object of this invention to provide a method for producing new and useful plutonium alkoxide compounds and, specifically, the trialkoxide compounds of plutonium.

Various other objects and advantages will appear and be understood from the following description of the invention and are particularly pointed out hereinafter in connection with the appended claims. Various changes in details, materials, etc., as described herein may be made by those skilled in the art without departing from the scope of what is presented herein.

What is presented here is a nonaqeuous method for dissolving plutonium which has been developed and which does away with many of the prior art problems. The organic solvents used are nonreactive to a large number of materials so as to permit their use when removing, as an example, plutonium from tungsten, steel, tantalum, molybdenum, nickel, glass, ceramics, graphite, etc. The dissolution of plutonium in the nonaqueous combination of alcohol intermixed with halogen was surprising and unexpected. The resultant products, such as plutonium methoxide, had never been produced and are useful as intermediates in the production of plutonium dioxide or other plutonium compounds.

The invention comprises the dissolution of plutonium by submerging same in an alcohol-halogen bath, filtering and evaporating the filtrate so as to leave a residue that contains plutonium alkoxide precipitate.

DETAILED DESCRIPTION OF INVENTION

Figure 1:
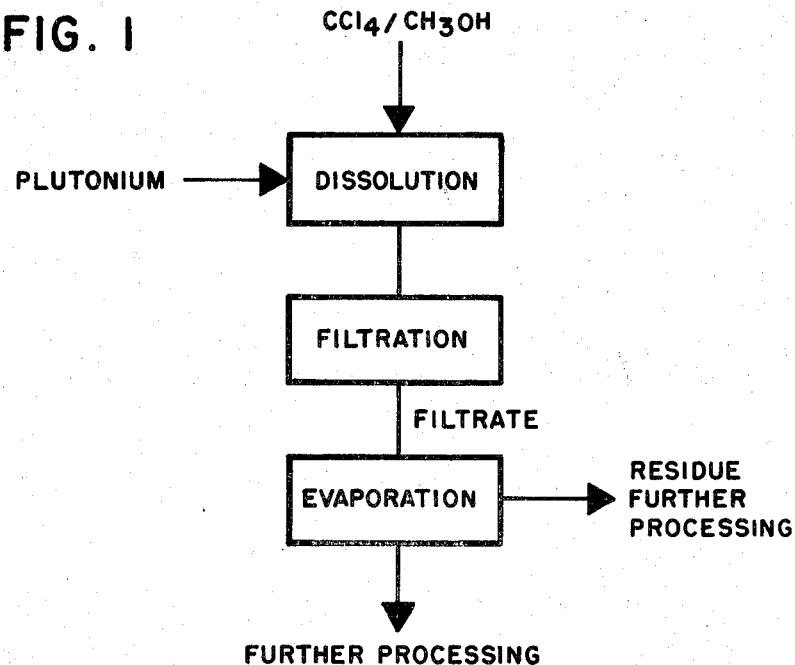
FIG. 1 illustrates a processing sequence for dissolution of plutonium and formation of a plutonium product.

FIG. 1 illustrates one processing sequence for using this invention. In FIG. 1, plutonium, in any form whatever, such as a solid deposit, ground particles, lathe turnings or spheres, may be placed in contact with or submerged in a solution or bath containing alcohol and halogen, such as methanol and carbon tetrachloride as illustrated in FIG. 1, and reacted therewith, as indicated by effervescence and by the bath becoming a different color. The reaction may be carried out at room temperature and atmospheric pressure. The bath may otherwise contain (1) an alcohol having the general formula ROH, where R is an alkyl radical having from one carbon to four carbons, such as methanol, ethanol, isopropanol or n-butanol, or mixtures thereof, containing a halogen gas, such as chlorine, bromine and iodine, or (2) a 10 to 90 volume percent of an alcohol from the group listed in (1) above mixed with 90 to 10 volume percent of a halogenated material selected from the group consisting of carbon tetrachloride, chloroform, 1,1,1-trichloroethane, 1,1,2-trichloro-1,2,2-trifluoroethane, carbon tetrabromide, bromoform, and 1,12-tribromoethane.

Once dissolution has been noted to be complete, as determined by the cessation of effervescene, the solution may be filtered by suitable means so as to remove insoluble materials, and the filtrate may be subsequently concentrated by appropriate means such as evaporation to a product containing plutonium trialkoxide. This product is preferably kept dry by maintaining it in a suitable atmosphere since the crystalline substance becomes amorphous upon standing in air.

It should be noted that this dissolution also applies to dissolution of uranium. Baths of varying alcohol and halogen concentrations have been successfully used to dissolve uranium in the same manner as the plutonium dissolution reactions discussed below.

Either bath (1) or (2) above will cause plutonium dissolution although at varying rates. Another dissolution rate factor, applicable to bath (2), is the volumetric proportion as well as type of material uses, as will be described hereinafter.

Figure 2:
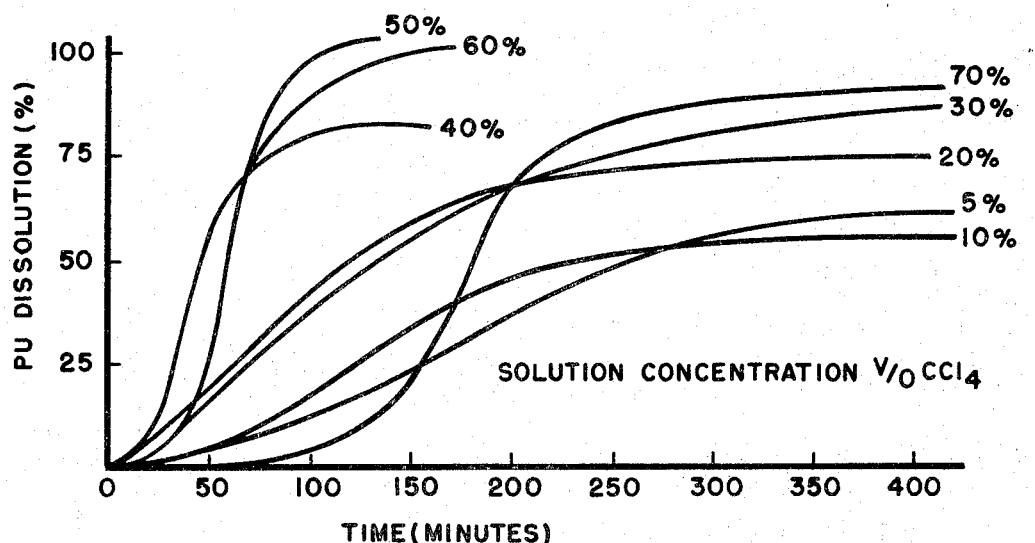
FIG. 2 depicts plutonium dissolution rates vs. changing alcohol/carbon tetrachloride ratios.

The rate of reaction to achieve dissolution of plutonium in a bath of carbon tetrachloride-methanol solution is dependent upon the volume ratio. Results of tests conducted at room temperature (ca. 22° C.) using one gram plutonium coupons in a 200 ml. bath of carbon tetrachloride (CCl₄)-methanol (CH₃OH) solution are shown in FIG. 2. In this process, dissolution generally initiates very slowly, presumably retarded by a protective oxide coating, and then, after some period of time which may be somewhat shortened by vigorous stirring, amount of surface area exposed, etc., a certain point may be reached where the plutonium dissolution rate accelerates, reaches a maximum, and then decreases until a certain percentage is reached whereat no more dissolves or dissolves at an insignificant rate. As shown in FIG. 2, optimum proportions to use may be about 50% by volume carbon tetrachloride and about 50% by volume methanol. Dissolution initiates after about one to three minutes and generally after about 40 minutes at this proportion, and at room temperature and atmospheric pressure, only about 15% plutonium coupon dissolution had occurred but, after an additional 50 minutes, virtually all of the plutonium had dissolved yielding a bluish green colored solution. As the carbon tetrachloride volume is increased or decreased from these proportions, the rate of dissolution decreased as well as the total amount of plutonium that would dissolve after an extended period of time. As an example, a 20% carbon tetrachloride-80% methanol solution dissolved approximately 60% of a plutonium coupon after 150 minutes but after an additional 250 minutes, only 10% more of the plutonium coupon had dissolved. This can readily be seen in FIG. 2.

In another dissolution, 0.559 gram of plutonium reacted in 14.3 ml. of 10 volume percent CCl₄ in methanol at room temperature. At the end of one hour, the solution was filtered and analyzed. It was then determined that 85.5% of the plutonium had dissolved. In still another example, 1.0107 grams of plutonium dissolved in 200 ml. of 40 volume percent of CCl₄ in methanol within 80 minutes at room temperature.

A short hand rendition of what is believed to be happening in the CCl₄/CH₃OH system is:

(1) 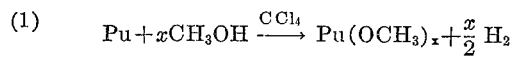
$$Pu + xCH_3OH \xrightarrow{CCl_4} Pu(OCH_3)_x + \frac{x}{2} H_2$$

where $x$ most likely has values from 3 to 4. This equation and formation of an alkoxide product is supported by the large volumes of hydrogen gas given off during the reaction.

Plutonium was found in the +3 oxidation state by visible absorption spectroscopy following dissolution. Upon standing in air (20 hours) the solution changed from blue-green to brown, and the plutonium was oxidized to the +4 state.

Chloroform has also been identified in the solution containing plutonium both in the +3 and in the +4 states. This suggests the reaction:

(2) 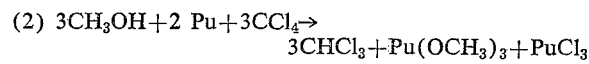
$$3CH_3OH + 2 Pu + 3CCl_4 \rightarrow 3CHCl_3 + Pu(OCH_3)_3 + PuCl_3$$

Infrared analysis of the evaporated product indicates that the product in the above reaction includes plutonium methoxide. Analysis of the product solids and solutions may be limited because of the product sensitivity to air. It is concluded that the product consists primarily of plutonium polyalkoxide as determined by the type of alcohol used.

Compounds other than carbon tetrachloride may be used in this reaction. The use of a chlorine gas saturated methanol solution initiates dissolution of plutonium coupons most readily, generally between three and five seconds in a methanol system. Chloroform, 1,1,1-trichloroethane, and 1,1,2-trichloro-1,2,2-trifluoroethane, sodium chloride, each in conjunction with methanol also caused plutonium dissolution. Methanol solutions containing plutonium chloride or chlorine also resulted in plutonium dissolution. Further, plutonium chloride itself dissolved in methanol and other alcohols but not in carbon tetrachloride, etc. The substitution of other alcohols, such as isopropanol, ethanol or n-butanol, resulted in the same dissolution reaction but dissolution required much longer periods of time and a diserent colored solution resulted as dissolution progresed. For example, a solution of carbon tetrachloride with methanol upon dissolution of plutonium leaves a bluish green color, with isopropanol-deep blue, with n-butanol-yellow brown, with ethanol-black granular solid particles. Alcohol systems containing carbon tetrachloride in the order of descending dissolution activity are such as methanol, ethanol, n-butanol and isopropanol.

Compounds which have a double bond group when added to the methanol did not dissolve the plutonium. Examples of these are trichloroethylene, tetrachloroethylene, or acetone. Neither did plutonium react significantly in pure alcohol alone or pure carbon tetrachloride alone or other similar compounds.

The rate of dissolution may also be affected by solution temperature. Thus a slight warming of the solution may substantially increase the rate of dissolution and a preferred temperature range is from about 10° C. to about 50° C. dependent upon the system used. With CH₃OH/CCl₄ system, ambient temperature is preferred (about 20° C. to 25° C.). Further, the rate of dissolution in a bath may be affected by the extent of surface area available to the solution and rate of stirring or agitation of the bath. As these increase, the dissolution rate may increase also. It must be noted that although submersion and immersion have been discussed primarily, the plutonium desired to be dissolved may be contacted in any manner such as swabbing, spraying, or just contact of a plutonium containing surface with the solvent solution and it is intended that the terms submersion or immersion encompass these other ways of accomplishing the same purpose.

The subject of this invention is useful in many areas. These areas include tool salvage procedures (Example I), intermediate step in formation of plutonium formate (Example II) and as an intermediate step in formation of plutonium dioxide (Example III). This description of examples does not, in any way, attempt to limit the extent of this invention or to restrict this invention to the examples cited.

Example I

AISI 4340 type steel members had a layer of plutonium which prevented the reuse of these members. This dissolution method herein claimed was used with 40 volume percent carbon tetrachloride in methanol at room temperature to effect dissolution of the plutonium by permitting the effervescing reaction to go to completion. Since the steel is relatively unreactive to the bath, the plutonium dissolves while the steel is not objectionably affected and can thus be reused after rinsing in a claim solution. The resultant solution is then procesed to remove or react the plutonium therein.

Example II

The process described herein has also been used to dissolve plutonium and then to react the resultant solution with formic acid to produce the precipitate plutonium formate which is filtered by suitable means, and then decomposed by heating in an appropriate air or gas atmosphere and environment to plutonium dioxide at low temperatures (250° C. to 350° C.) to produce a reasonably nonrefractory oxide at a high rate.

Example III

The evaporated plutonium product achieved by this process may also be calcined, under suitable pressure and temperature, directly to plutonium dioxide. This process therefore is of importance in the production of plutonium dioxide. As an alternative, calcination may proceed as described in Example II to yield the nonrefractory oxide.

What is claimed is:

1. A method of dissolving plutonium comprising submerging plutonium in a bath containing an alcohol having the general formula ROH, where R is an alkyl radical having from one to four atoms of carbon, and a halogen taken from the group consisting of a halogen gas absorbed in said alcohol, carbon tetrachloride, chloroform, 1,1,1-trichloroethane, 1,1,2-trichloro-1,2,2-trifluoroethane, carbon tetrabromide and bromoform, filtering the resultant solution and then evaporating the solution to yield a plutonium alkoxide.

2. The method of claim 1 wherein said bath comprises about 10% to 90% by volume of methanol and about 90% to 10% by volume of carbon tetrachloride.

3. The method of claim 1 wherein said bath comprises about 50% by volume methanol and about 50% by volume carbon tetrachloride.

4. The method of claim 1 wherein said bath comprises chlorine gas dissolved in methanol.

5. The method of claim 1 wherein said bath is at a temperature of from about 10° C. to 50° C.

6. The method of claim 1 wherein said bath is at a temperature from about 20° C. to about 25° C.

7. The method of claim 1 wherein the said plutonium is dissolved from a condensed state on a tool and the tool is salvaged thereby.

8. The method of claim 1 wherein the alcohol is taken from the group consisting of methanol, ethanol, isopropanol, n-butanol and mixtures thereof.

References Cited

Bradley et al.: Chem. Abs. vol. 51, pp. 16173–4 (1957).
Pitts, Jr.: Chem. Abs., vol. 65, p. 16482 (1966).

LELAND A. SEBASTIAN, Primary Examiner